United States Patent
Okamura

(10) Patent No.: US 9,457,752 B2
(45) Date of Patent: Oct. 4, 2016

(54) VEHICLE COLLISION DETERMINATION APPARATUS

(71) Applicant: HONDA MOTOR CO., LTD., Tokyo (JP)

(72) Inventor: Kenyu Okamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/514,898

(22) Filed: Oct. 15, 2014

(65) Prior Publication Data

US 2015/0105982 A1 Apr. 16, 2015

(30) Foreign Application Priority Data

Oct. 16, 2013 (JP) ................................. 2013-215654

(51) Int. Cl.
*B60R 21/0132* (2006.01)

(52) U.S. Cl.
CPC ................................. *B60R 21/0132* (2013.01)

(58) Field of Classification Search
CPC ................................................ B60R 21/0132
USPC ............................................................ 701/45
See application file for complete search history.

(56) References Cited

U.S. PATENT DOCUMENTS 6,167,335 A * 12/2000 Ide .................... B60R 21/013
180/271

FOREIGN PATENT DOCUMENTS

| DE | 10017084 | 8/2001 | |
| DE | 10103661 | 8/2002 | |
| DE | 10215384 | 12/2002 | |
| DE | 10150046 | 7/2003 | |
| DE | 10320738 | 12/2004 | |
| DE | 102005012949 | 9/2006 | |
| DE | 102005042198 | 3/2007 | |
| DE | 102007048884 | * 4/2009 | ......... B60R 21/0136 |
| DE | 102007052159 | 7/2009 | |
| JP | 2006-044432 | 2/2006 | |

OTHER PUBLICATIONS

German Search Report and English Translation dated Jan. 30, 2015, 16 pages.
German Office Action with English Translation dated Dec. 8, 2015, 12 pages.

* cited by examiner

*Primary Examiner* — Brian P Sweeney
(74) *Attorney, Agent, or Firm* — Rankin, Hill & Clark LLP

(57) ABSTRACT

A vehicle collision determination apparatus includes a first sensor and a second sensor provided in a cabin of a vehicle, and a determining portion that determines severity of a frontal collision of the vehicle based on the difference between an output from the first sensor and an output from the second sensor. The output from the first sensor includes a first acceleration in a backward direction of the vehicle, and the output from the second sensor includes a second acceleration in the backward direction of the vehicle. The first sensor and the second sensor are arranged along the backward direction.

12 Claims, 12 Drawing Sheets

VEHICLE COLLISION DETERMINATION APPARATUS

FIELD OF THE INVENTION

The present invention relates to a vehicle collision determination apparatus configured to determine a collision of a vehicle using two floor sensors provided in a cabin of the vehicle. Especially, the term "collision" used herein shall be interpreted as including a frontal collision where a front end (e.g. bumper face) of the vehicle is made to collide with a barrier (e.g. vehicle, wall, etc.), and the term "determination" used herein shall be interpreted as including determination of collision severity at the event of a frontal collision.

BACKGROUND OF THE INVENTION

Vehicle collision determination apparatuses are known as disclosed, for example, in Japanese Patent Application Laid-open Publication (JP-A) No. 2006-044432. The vehicle collision determination apparatus disclosed in JP 2006-044432 takes the form of a vehicle occupant protection apparatus equipped with a front G sensor, a floor G sensor, and an airbag deployment determination means. The front G sensor is mounted to a front part of a vehicle (radiator core supporting a radiator), and the floor G sensor is disposed at substantially the center of a cabin of the vehicle. The airbag deployment determination means includes a subtraction means which can calculate the difference between a time-integrated value of an output (deceleration) of the front G sensor and a time-integrated value of an output (deceleration) of the floor G sensor, thus calculating attenuation amount of the output (deceleration) of the front G sensor. The airbag deployment determination means performs calculation of the difference in order to determine the collision mode when a frontal collision occurs.

The collision determination apparatus disclosed in JP 2006-044432 is, however, not fully satisfactory in that the airbag deployment determination means cannot discriminate a high-speed ODB (offset deformable barrier) frontal collision where the vehicle is made to collide head-on on the driver's side with an aluminum honeycomb structure at 64 km/h and a slant head-on collision where the vehicle is made to collide head-on on the driver's side with a slanting concrete barrier at 48 km/h. The severity of the high-speed ODB frontal collision is therefore determined as being "high". Furthermore, when the vehicle is made to collide with a concrete barrier at 37 km/h, the severity of such frontal collision is determined as being "low".

It is therefore an object of the present invention to provide a vehicle collision determination apparatus which is capable of protecting a vehicle occupant more appropriately. Other objects of the invention will become apparent to a person skilled in the art from the following description of preferred embodiments taken in conjunction with the accompanying drawings.

SUMMARY OF THE INVENTION

According to one aspect of the present invention, there is provided a vehicle collision determination apparatus comprising: a first sensor and a second sensor provided in a cabin of a vehicle; and a determining portion that determines severity of a frontal collision of the vehicle based on the difference between an output from the first sensor and an output from the second sensor, wherein the output from the first sensor includes a first acceleration in a backward direction of the vehicle, wherein the output from the second sensor includes a second acceleration in the backward direction of the vehicle, and wherein the first sensor and the second sensor are arranged along the backward direction.

In the vehicle collision determination apparatus, both the first sensor and the second sensor are provided in the vehicle cabin. Since the severity of a frontal collision of the vehicle depends on the vehicle speed and collision energy inputted to the vehicle cabin, the determining portion can determined the severity of the frontal collision of the vehicle with improved accuracy based on the difference between the output from the first sensor and the output from the second sensor. More specifically, the determining portion is able to determine the severity of a high-speed ODB (offset deformable barrier) frontal collision as being "low". At the event of the high-speed ODB frontal collision, by virtue of the softness of a honeycomb structure against which the vehicle is made to collide, collision energy is reduced before being inputted to the vehicle cabin. Deceleration of the vehicle (i.e., acceleration in the backward direction of the vehicle) produced during the high-speed ODB frontal collision is smaller than deceleration of the vehicle produced during a full-wrap frontal collision of the vehicle. On the other hand, a time period during which the vehicle deceleration is produced is longer at the high-speed ODB frontal collision than at the full-wrap frontal collision. These conditions or items of information are reflected on the output (deceleration) of the first sensor and the output (deceleration) of the second sensor both provided in the vehicle cabin, so that the vehicle collision determination apparatus can more appropriately determine severity of a frontal collision of the vehicle and utilize the thus determined collision severity in controlling operation of an airbag and a webbing so as to more appropriately protecting an occupant of the vehicle.

Preferably, the determining portion determines the severity of the frontal collision based on an integrated value of the difference. By thus using the integrated value of the difference between the output from the first sensor and the output from the second sensor, the determining portion can easily determine the collision severity as compare to a collision severity determination process in which the difference between an integrated value of the output from the first sensor and an integrated value of the output from the second sensor is used.

Preferably, the determining portion determines the severity of the frontal collision based on an integrated value of the difference and an integrated value of either one of the output from the first sensor and the output from the second sensor. By thus using two integrated values, the determining portion can readily determine the collision severity by determining whether or not a coordinate decided by the two integrated values exceeds a two-dimensional threshold in a two-dimensional map.

Preferably, the determining portion determines the severity of the frontal collision based on the difference and the current time. The determining portion does not need an integrated value of the difference and hence is able to reduce the amount of operation required for the frontal collision severity determination.

Preferably, the first sensor and the second sensor are disposed along a longitudinal centerline of the vehicle. This arrangement allows the determining portion to use the first and second sensors disposed along the longitudinal centerline of the vehicle.

Preferably, the first sensor and the second sensor are provided on a same structural member of a vehicle body skeleton of the vehicle, the same structural member being disposed along the backward direction. With this arrangement, since collision energy inputted to the vehicle cabin is reduced or attenuated by the same structural member of the vehicle body skeleton, noise included in the difference between the output from the first sensor and the output from the second sensor can be reduced.

Preferably, the first sensor is disposed on one end of the same structural member, and the second sensor is disposed on an opposite end of the same structural member. With this arrangement, since the collision energy is attenuated by the same structural member, the difference between the output from the first sensor and the output from the second sensor becomes large.

Preferably, the determining portion determines whether or not the frontal collision has occurred by using the output from the first sensor. The output from the first sensor can thus be used for determining the occurrence of the frontal collision.

Preferably, the first sensor and the second sensor are disposed on a lateral side of the vehicle. The determining portion is now allowed to use outputs from the first and second sensors disposed on the lateral side of the vehicle.

Preferably, the output from the first sensor includes a third acceleration in a rightward or leftward direction of the vehicle, the output from the second sensor includes a fourth acceleration in the rightward or leftward direction of the vehicle, and the determining portion determines whether or not a side collision of the vehicle has occurred by using the third acceleration and the fourth acceleration. The output from the first sensor and the output from the second sensor can thus be used for determining as to whether or not a side collision of the vehicle has occurred.

Preferably, the vehicle collision determination apparatus further includes a first band-pass filter which passes a prescribed range of frequencies of the output from the first sensor, and a second band-pass filter which passes the prescribed range of frequencies of the output from the second sensor. By virtue of the first and second band-pass filters, the difference between the output from the first sensor and the output from the second sensor can be enhanced.

Preferably, the determining portion, on the basis of the severity of the frontal collision, determines one corresponding binding force selected from among a plurality of binding forces, and the one corresponding binding force is produced while a webbing provided on the vehicle is restraining an occupant of the vehicle upon the occurrence of the frontal collision. With this arrangement, the determining portion is able to more appropriately set a binding force (protecting force) to be applied from the webbing to the vehicle occupant.

DETAILED DESCRIPTION OF THE PREFERRED EMBODIMENT

Certain preferred structural embodiments of the present invention will be described in detail below, by way of example only, with reference to the accompanying sheets of drawings.

Figure 1:
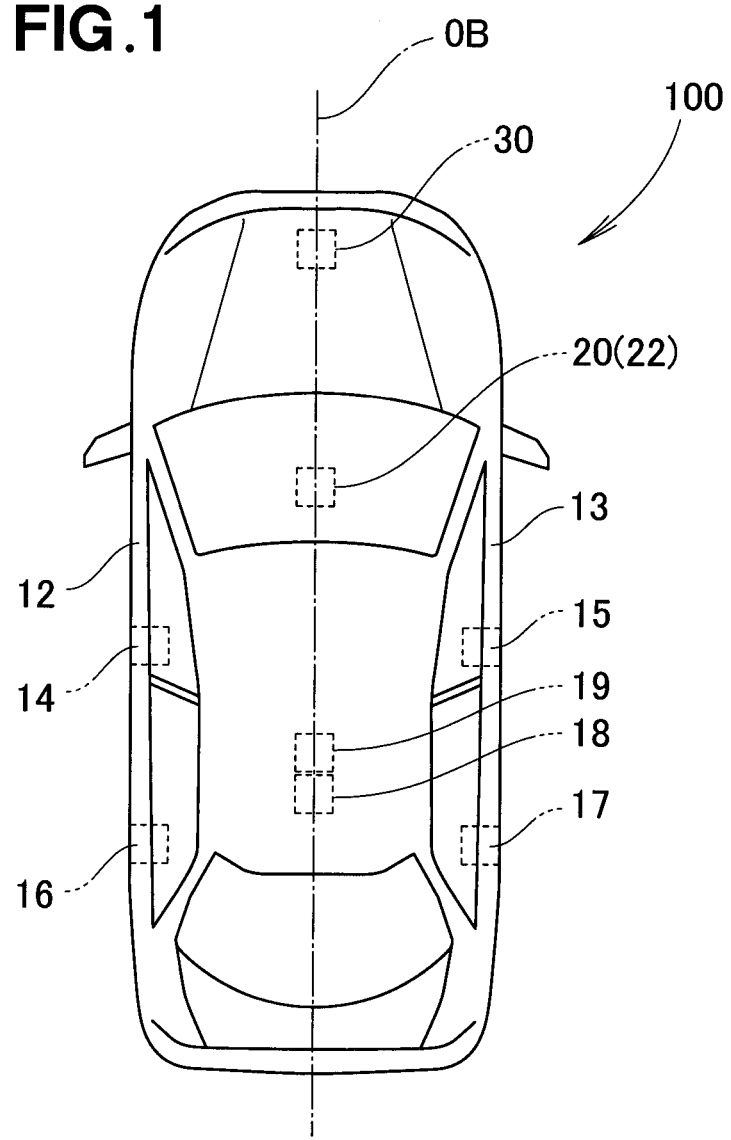
FIG. 1 is a plan view illustrative of an arrangement of plural sensors provided on a vehicle.

FIG. 1 shows in plan view an arrangement of a plurality of sensors provided on a vehicle. The vehicle 100 shown in FIG. 1 is equipped with a vehicle collision determination unit 20 which is configured to determine a collision of the vehicle. The vehicle collision determination unit 20 is disposed on a central portion of the vehicle 100. The vehicle collision determination unit 20 may be provided on a floor of a cabin of the vehicle 100 and may incorporate a first floor sensor 22 shown in FIG. 2. As shown in FIG. 1, a front sensor 30 is provided on a front part of the vehicle 100. The vehicle collision determination unit 20 shown in FIG. 1 may determine as to whether or not a frontal collision of the vehicle occurs based on only an output of the first floor sensor 22 or an output of the front sensor 30. However, it is preferable that the vehicle collision determination unit 20 determines whether or not a frontal collision of the vehicle 100 occurs based on the output of the front sensor 30 and the output of the first floor sensor 22.

Figure 2:
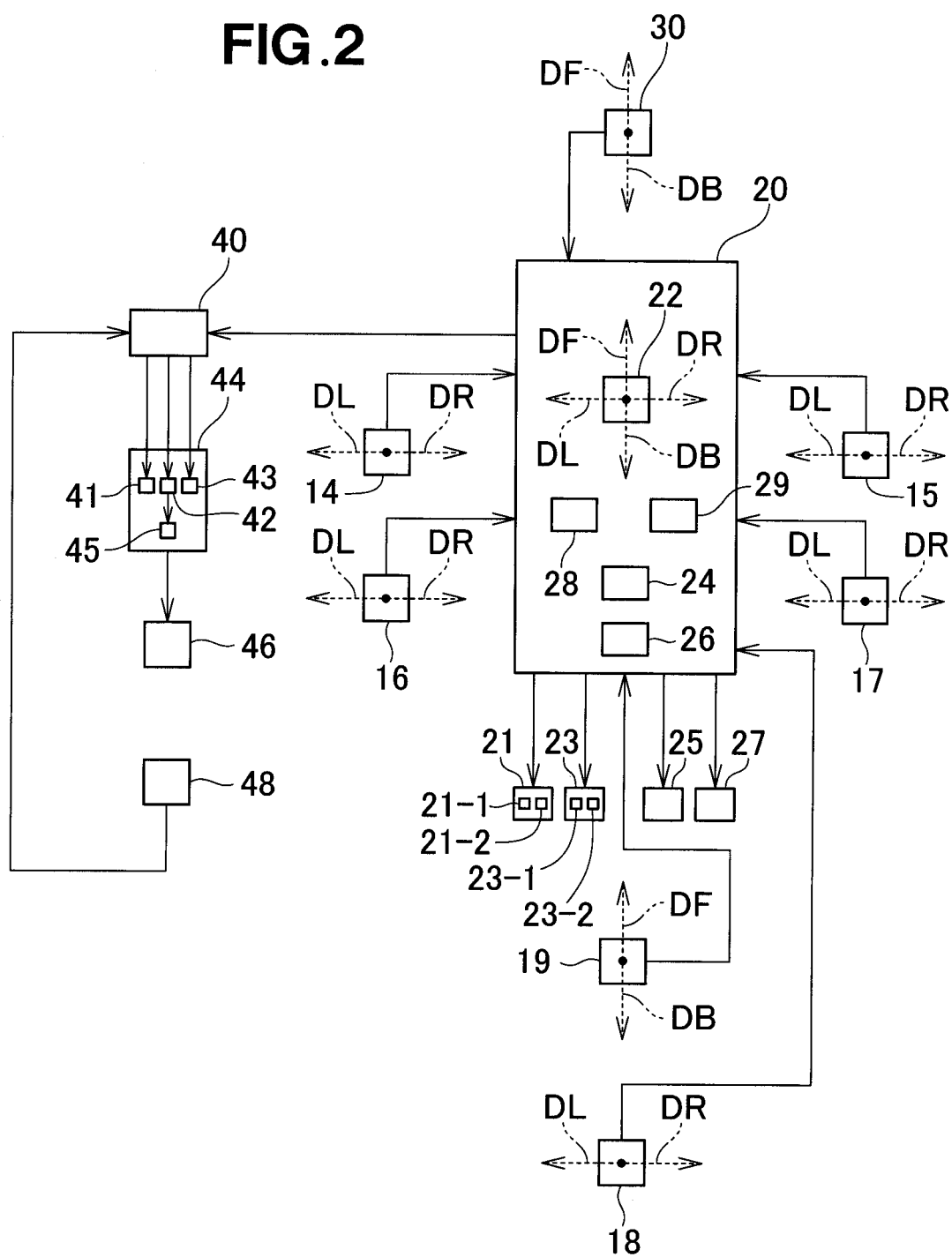
FIG. 2 is a view diagrammatically showing a configuration of a vehicle collision determination apparatus according to a first embodiment of the present invention.

The first floor sensor 22 shown in FIG. 2 may be provided on a part of the cabin of the vehicle (such as an instrument panel, a steering wheel, etc.) which is outside the vehicle collision determination unit 20. As an alternative, the vehicle collision determination unit 20 incorporating the first floor sensor 22 may be provided on a part of the cabin of the vehicle 100 (such as the instrument panel, the steering wheel, etc.) excluding the floor of the cabin. The first floor sensor 22 may be called as a central sensor or a unit sensor.

The frontal collision where the front part of the vehicle 100 is made to collide with a barrier may include, not only a "full-wrap frontal collision" where a front surface of the front part of the vehicle is made to collide with the barrier, but also an "offset frontal collision" where a side surface (e.g. a front fender) of the front part of the vehicle 100 is made to collide with the barrier. Furthermore, collisions of the vehicle 100 may include, additional to the frontal collision, a side collision where a side part (e.g. a front door or a rear door) of the vehicle 100 is made to collide with a barrier. The vehicle collision determination unit 20 shown in FIG. 1 may determine not only as to whether or not a full-wrap frontal collision of the vehicle 100 occurs, but also as to whether another collision, such as an offset frontal collision or a side collision of the vehicle, occurs. It is preferable for the vehicle collision determination unit 20 to determine severity of a frontal collision, for example.

More specifically, the vehicle collision determination unit 20 may determine the severity of a frontal collision of the vehicle 100 based on the difference between an output of a first sensor and an output of a second sensor where the first sensor comprises the first floor sensor 22, and the second sensor comprises a second floor sensor 19 provided on the floor of the cabin of the vehicle 100. The vehicle collision determination unit 20 is able to control an airbag for a driver's seat and an airbag for a front passenger seat based on an output of the first floor sensor 22 and an output of the second floor sensor 19 (as well as an output of the front sensor 30). It is preferable that the vehicle collision determination unit 20 controls airbags on lateral sides 12, 13 of the vehicle (e.g. side airbags, side curtain airbags, etc.) based on respective outputs of satellite impact sensors 14, 15, 16 and 17.

The vehicle collision determination unit 20 is able to perform deployment of the airbag for the driver's seat and deployment of the airbag for the front passenger seat based on the output of the first floor sensor 22 and the output of the second floor sensor 19 (as well as the output of the front sensor 30) independently from the outputs of the satellite impact sensors 14, 15, 16 and 17. Furthermore, the vehicle collision determination unit 20 is also able to perform deployment of the airbags on the lateral sides 12, 13 of the vehicle 100 based on the outputs of the satellite impact sensors 14, 15, 16 and 17 independently from the outputs of the first and second floor sensors 22, 19 (and the output of the front sensor 30).

The vehicle 100 shown in FIG. 1 may further include a satellite saving sensor 18. The satellite saving sensor 18 is disposed on a longitudinal centerline OB of the vehicle 100. With this arrangement, by using an output from the satellite saving sensor 18, the vehicle collision determination unit 20 is able to further properly determine as to whether the airbags on the lateral sides of the vehicle 100 are to be deployed or not.

The satellite saving sensor 18 and the second floor sensor 19 are not necessarily provided on the vehicle 100 shown in FIG. 1. In other words, FIG. 1 merely exemplifies a preferred form of embodiment and, according to at least one object of the present invention, the vehicle 100 may be equipped with at least two of the sensors 22, 19, 15, 16, 17 and 18 and the vehicle collision determination unit 20 uses outputs from the at least two sensors.

FIG. 2 shows an example of configuration of the vehicle collision determination apparatus according to the present invention. The vehicle collision determining apparatus is comprised of the first floor sensor (first sensor) 22, the second floor sensor (second sensor) 19, and the vehicle collision determination unit 20. The vehicle collision determination unit 20 shown in FIG. 2 uses outputs from other sensors 30, 14, 15, 16 and 17, however, the vehicle collision determination unit 20 may not use the outputs from the sensors 30 and 14-17. In other words, the vehicle collision determination apparatus can be formed only by the first floor sensor (first sensor) 22, the second floor sensor (second sensor) 19, and a determining portion 24 of the vehicle collision determination unit 20. The determining portion 24 can determine severity of a frontal collision of the vehicle 100 based on the output from the first floor sensor (first sensor) 22 and the output from the second floor sensor (second sensor) 19.

As shown in FIG. 1, the first floor sensor (first sensor) 22 and the second floor sensor (second sensor) 19 are both provided in the cabin of the vehicle 100. The output from the first floor sensor (first sensor) 22 shown in FIG. 2 includes at least an acceleration in a backward direction DB of the vehicle 100 (first acceleration or first deceleration a22), and the output from the second floor sensor (second sensor) 19 includes at least an acceleration in the backward direction DB of the vehicle 100 (second acceleration or second deceleration a19). As shown in FIG. 2, each of the outputs from the first and second floor sensors 22, 19 may further include an acceleration in a forward direction DF of the vehicle 100, and the output from the first floor sensor 20 may further include an acceleration in a rightward direction DR and/or a leftward direction DL of the vehicle 100. The severity of the frontal collision of the vehicle 100 depends on a magnitude of the speed of the vehicle 100 and a magnitude of collision energy inputted to the vehicle cabin. The determining portion 24 shown in FIG. 2 can determine the frontal collision severity with increased accuracy based on the difference between the output (acceleration in the backward direction DB) from the first floor sensor (first sensor) 22 and the output (acceleration in the backward direction DB) from the second floor sensor (second sensor) 19. More specifically, the determining portion 24 can easily discriminate between a high-speed ODB (offset deformable barrier) frontal collision at a predetermined collision speed and a high-speed full-wrap frontal collision at a collision speed substantially equal to the predetermined collision speed in the high-speed ODB frontal collision. The determining portion 24 can thus determine the frontal collision severity in a more appropriate manner.

When the high-speed ODB frontal collision occurs, the speed of the vehicle 100 is high, but collision energy inputted to the vehicle cabin is small due to the softness of a honeycomb structure. Severity of such high-speed ODB frontal collision can thus be determined as being "low", and the vehicle collision determination apparatus uses the thus determined collision severity for deployment of an airbag module 21 for the driver's seat and an airbag module 23 for the front passenger seat so as to ensure more appropriate protection of the occupants. Furthermore, the determining portion 24 can output the severity of the frontal collision to a control unit 40 for a seatbelt device so that the vehicle collision determination apparatus is able to more properly protect the occupant with a webbing 46 of the seatbelt device. In the case where the vehicle 100 is equipped with the seatbelt device and the control unit 40 and the vehicle collision determination unit 20 controls the airbag modules 21, 23, the vehicle collision determination apparatus or the vehicle collision determination unit 20 may be called as an SRS (supplemental restraint system) or an SRS unit. The control unit 40 and the SRS unit 20 can be constituted by a single electronic control unit (ECU) in which instance a winding device (or retractor) 44 and the airbag modules 21, 23 can be controlled by the single ECU.

As shown in FIG. 2, the determining portion 24 preferably uses the output from the front sensor 30. It is further preferable for the determining unit 24 to use the outputs from the sensors 14, 15, 16, 17 and 18. Various advantages attained by using the outputs of the sensors 30 and 14-18 will be described later on.

Figure 3:
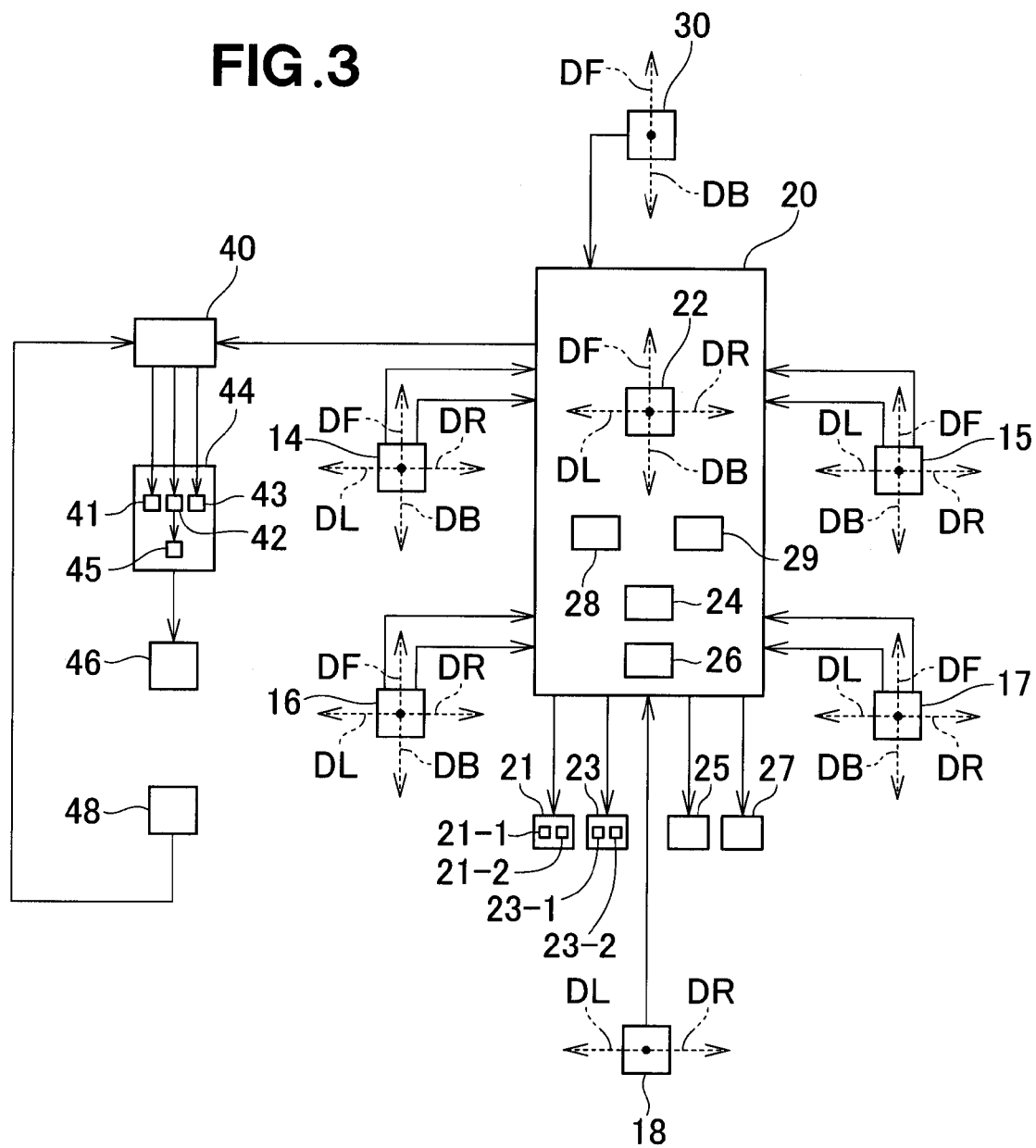
FIG. 3 is a view diagrammatically showing a configuration of a vehicle collision determination apparatus according to a second embodiment of the present invention.

FIG. 3 shows another example of configuration of the vehicle collision determination apparatus according to the present invention. As previously described, the determining portion 24 shown in FIG. 2 can determine the severity of a frontal collision based on the output from the first floor sensor (first sensor) 22 and the output from the second floor sensor (second sensor) 19. On the other hands, the determining portion 24 shown in FIG. 3 is configured to use an output from the right front satellite impact sensor 15 as the output from the first sensor and an output from the right rear satellite impact sensor 17 as the output from the second sensor. As an alternative, the determining portion 24 shown in FIG. 3 can use respective outputs from the left front and rear satellite impact sensors 14 and 16 as the outputs from the first and second sensors. In the former case, for example, the output from the right front satellite impact sensor 15 includes at least an acceleration in the backward direction DB of the vehicle 100 (first acceleration or first deceleration a15), and the output from the right rear satellite impact sensor 17 includes at least an acceleration in the backward direction DB of the vehicle 100 (second acceleration or second deceleration a17).

As shown in FIG. 3, the output of the right front satellite impact sensor (first sensor) 15 may further include an acceleration in the leftward direction DL of the vehicle 100 (third acceleration), and the output of the right rear satellite impact sensor (second sensor) 17 may further include an acceleration in the leftward direction DL of the vehicle 100 (fourth acceleration). Additionally, each of the outputs from the right front and rear satellite impact sensors (first and second sensors) 15, 17 may further include an acceleration in a forward direction DF of the vehicle 100 and/or an acceleration in the rightward direction DR of the vehicle 100. Similarly, the output of the left front satellite impact sensor (first sensor) 14 may further include an acceleration in the rightward direction DR of the vehicle 100 (third acceleration), and the output of the left rear satellite impact sensor (second sensor) 16 may further include an acceleration in the rightward direction DR of the vehicle 100 (fourth acceleration). Additionally, each of the outputs of the left front and rear satellite impact sensors (first and second sensors) 14, 16 may further include an acceleration in the forward direction DF of the vehicle and/or an acceleration in the leftward direction DL of the vehicle 100.

The determining portion 24 shown in FIG. 3 is able to determine the severity of a frontal collision of the vehicle 100 based on the difference between the outputs of at least two satellite impact sensors 15 and 17 or 14 and 16 (namely, the difference between at least two accelerations or decelerations in the backward direction DB). Since the at least two satellite sensors (first and second sensors) 15, 17, 14, 16 are provided in the cabin of the vehicle 100, the determining portion 24 shown in FIG. 3 can determine the severity of the frontal collision of the vehicle 100 with increased accuracy such that the severity of a high-speed ODB frontal collision can be determined as being "low".

Figure 4:
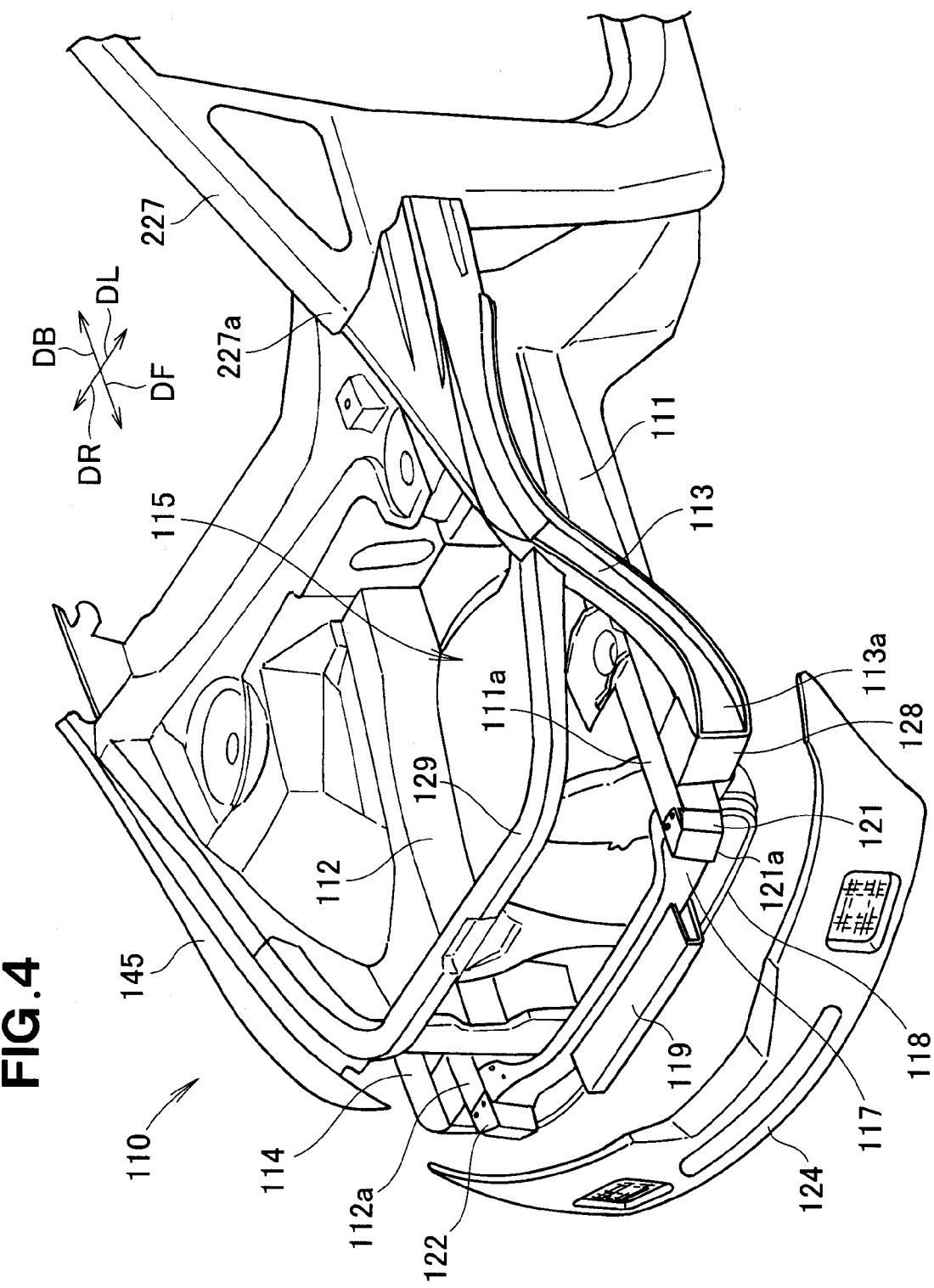
FIG. 4 is a perspective view showing one structural example of a front part of the vehicle shown in FIG. 1.

FIG. 4 shows in perspective an example of configuration of a front part of the vehicle 100 shown in FIG. 1. The front sensor 30 shown in FIG. 1 is provided on any desired place of a front part 110 of the vehicle 100. At the time of a frontal collision where the front part 110 of the vehicle 100 is made to collide with a barrier, the front sensor 30 can detect the occurrence of such collision before other sensors 22, 19, 14, 15, 16, 17 and 18 detect the same collision. In other words, the front part 110 of the vehicle 100 has an ability to absorb impact energy at the time of a frontal collision, and it becomes difficult for the sensors 22, 19, 14, 15, 16, 17 and 18 to detect the occurrence of the frontal collision as compared to the front sensor 30.

The front part 110 of the vehicle 100 includes a front body and panels provided on the front body. As shown in FIG. 4, the panels provided on the front body include a right front fender 145 that forms a side surface of the front part 110, and a front bumper face 124 that forms a front surface of the front part 110. Disposed next to the front part 110 of the vehicle 100 or a left upper member 113 for example is a side panel or a front pillar (A-pillar) 227.

The front part (or front body) 110 of the vehicle 100 shown in FIG. 4 includes a left front side frame 111 and a right front side frame 112. The left and right front side frames 111, 112 are connected by a bumper beam 117 provided between a front end portion 111a of the left front side frame 111 and a front end portion 112a of the right front side frame 112. In FIG. 4, the left front side frame 111 or the front end portion 111a thereof may include a left extension member 121, and the right front side frame 112 or the front end portion 112a thereof may include a right extension member 122. Furthermore, the bumper beam 117 may include a center extension member 119 provided on a central portion thereof. The front bumper face 124 is disposed forwardly of the bumper beam 117 or the center extension member 119.

As shown in FIG. 4, the left upper member 113 for example is disposed on a lateral outer side of the left front side frame 111, and the left upper frame 113 is connected to the left front side frame 111 via a connecting member 128. The left upper member 113 extends from the connecting member 128 in an upward and rearward direction of the left front side frame 111 to a lower end portion 227a of the left front pillar 227. With this arrangement, a load applied to a front end portion 113a of the left upper member 113 can be transmitted to the left front pillar 227.

The left and right front side frames 111, 112 and the left and right upper member 113, 114 together form a framework of a drive unit chamber such as an engine room 115. A bulkhead defining a boundary of the engine room 115 includes a bulkhead upper frame 129 and a front bulkhead lower cross member 118. The bulkhead has a radiator (not shown) mounted thereon and, hence, the bulkhead may be also called as a radiator support portion. The left and right front side frames 111, 112 can support an engine (not shown).

Figure 5:
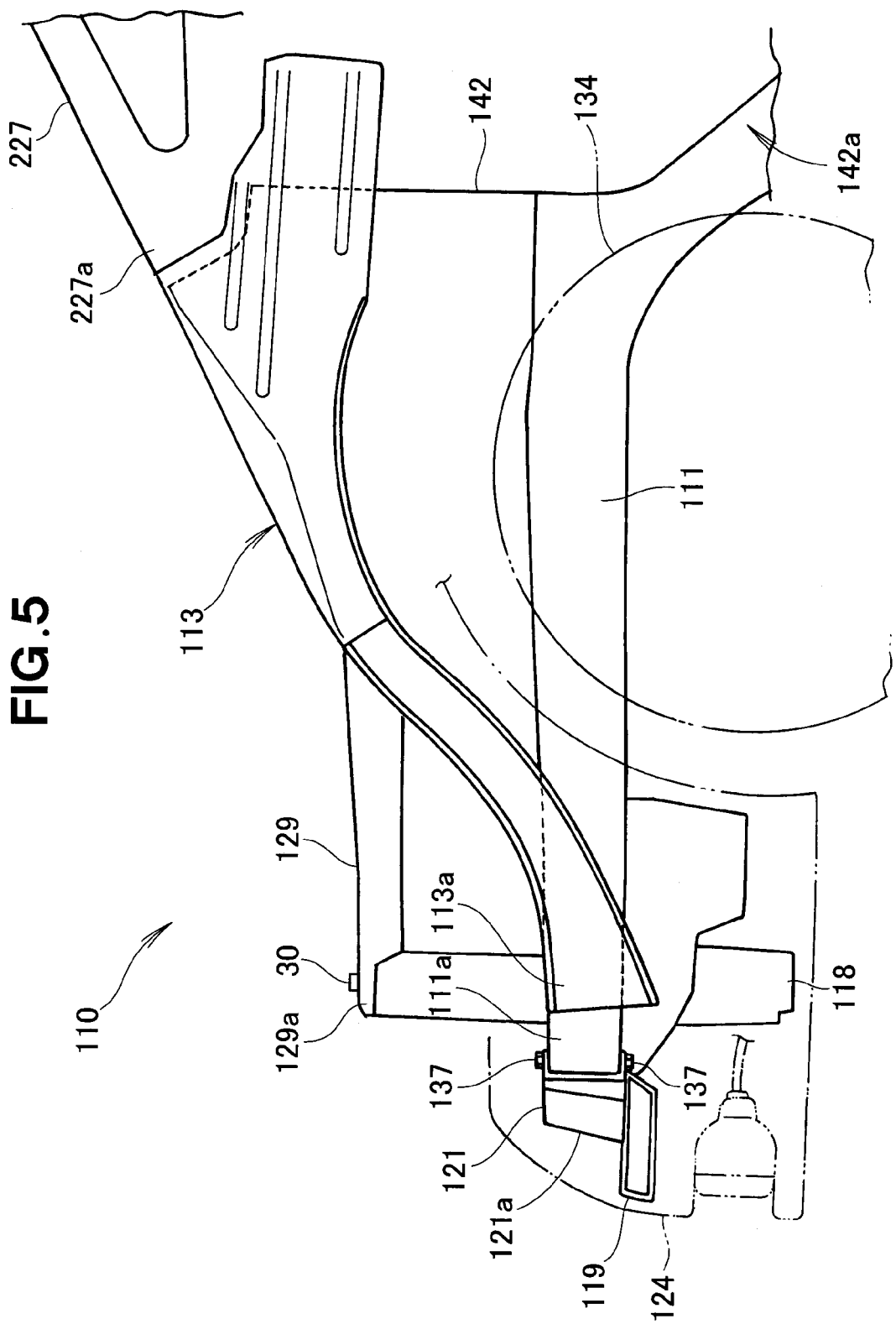
FIG. 5 is a side view of the front part of the vehicle shown in FIG. 4, showing the location of a front sensor.

FIG. 5 is a side view showing the front part 110 of the vehicle 100 shown in FIG. 4 and an example of arrangement of the front sensor 30. As shown in FIG. 5, the front sensor 30 is provided at a front end portion 129a or a front part of the bulkhead upper frame 129. When a load is applied to the front bumper face 124, the front bumper face 124, the center extension member 119, and the left extension member 121 undergo deformation, which will cause deformation of the bulkhead upper frame 129. The left extension member 121 is attached by a bolt 137 to the front end portion 111a of the left front side frame 111.

Since the front end portion 111a of the left front side frame 111 undergoes deformation prior to the start of deformation of the bulkhead upper frame 129, the front sensor 30 provided on the bulkhead upper frame 129 can reliably detect deformation of the bulkhead upper frame 129 (i.e., frontal collision of the vehicle), and the front sensor 30 is hardly broken. The front sensor 30 shown in FIG. 5 is disposed on the longitudinal centerline OB of the vehicle 100 shown in FIG. 1. The front sensor 30 may be constituted by two sensors, i.e., left and right front sensors (not shown) disposed at positions laterally offset from the longitudinal centerline OB. For example, the left and right front sensors may be provided on the bulkhead upper frame 129 so as to detect the mode of a frontal collision. The left front side frame 11 has an ability to absorb frontal collision energy so that a load applied to the front end 111a of the left front side frame 111 is transmitted to a dash panel 142 or a dash floor 142a. The dash panel 142 separates the engine room 115 and the cabin (passenger compartment) of the vehicle 100.

Figure 6A:
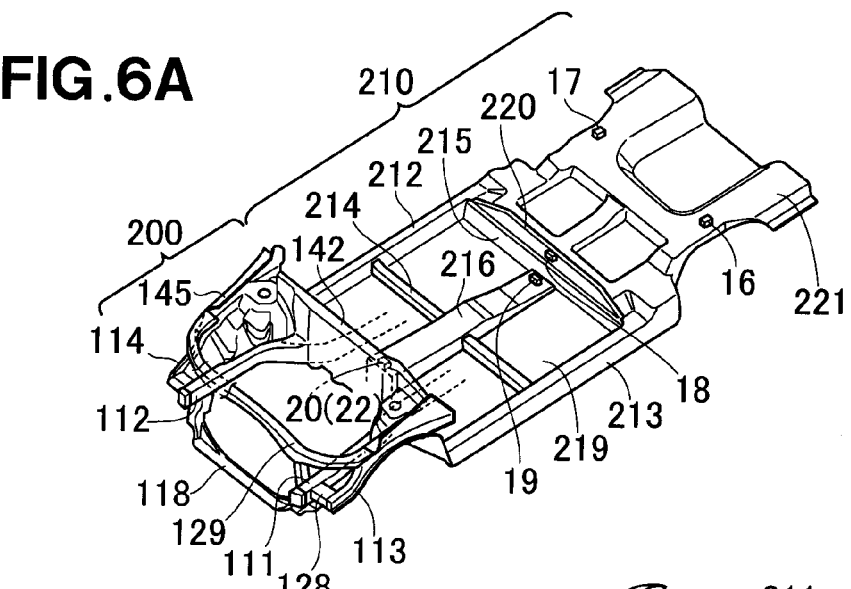
FIG. 6A is a perspective view showing one example of a vehicle body skeleton structure of the vehicle shown in FIG. 1 and an arrangement of a first floor sensor, second floor sensor, rear satellite impact sensors, and a satellite saving sensor.
Figure 6B:
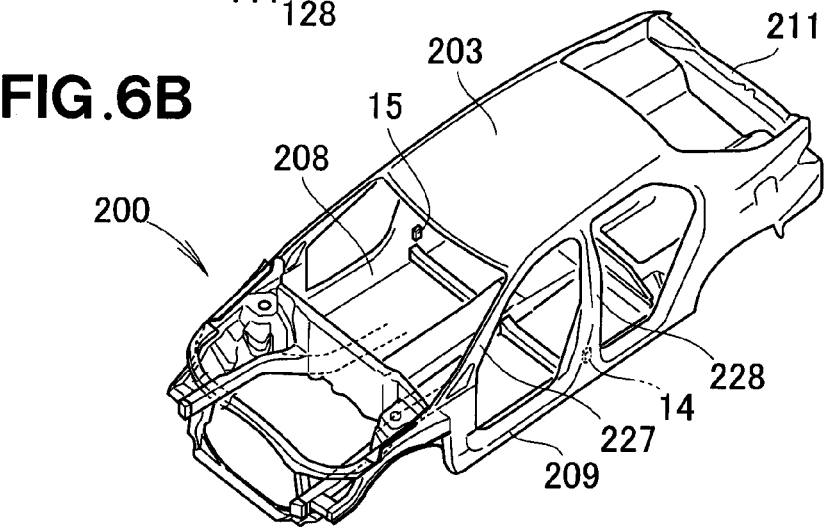
FIG. 6B is a perspective view showing one example of a main portion of the vehicle body shown in FIG. 1 and an arrangement of front satellite impact sensors.

Referring next to FIG. 6A, there is shown in perspective one example of a vehicle body skeleton structure of the vehicle 100 shown in FIG. 1 and an arrangement of the first floor sensor 22, the second floor sensor 19, the rear satellite impact sensors 16, 17, and the satellite saving sensor 18. FIG. 6B is a perspective view showing one example of a main portion of the body of the vehicle 100 shown in FIG. 1 and an arrangement of the front satellite impact sensors 14, 15. As shown in FIG. 6A, the body of the vehicle 100 includes a front body 200 and a floor body (rear body) 210. Furthermore, the vehicle body skeleton structure of the vehicle 100 includes, not only the left front side frame 110, the right front side frame 112, the bulkhead upper frame 129, the front bulkhead lower cross member 118, the dash panel 142, but also a right side sill 212, a left side sill 213, a middle cross member 214, a center cross member 215, and a center tunnel 216.

The floor body 210 shown in FIG. 6A includes a front floor 219 and a rear floor 221. Each of the left and right front side frames 111, 112 is connected via the dash panel 142 to the floor body 210 (e.g. the front floor 219 and a corresponding one of the left and right side sills 212, 212). With this arrangement, a load applied to the left and right front side frames 111, 112 can be distributed.

As shown in FIG. 6A, the first floor sensor (first sensor) 22 incorporated in the vehicle collision determination unit 20 is fixed to the floor body 210 or the front floor 219 (for example, a front part of the center tunnel 216). The first floor sensor (first sensor) 22 is preferably disposed on the longitudinal centerline OB of the vehicle 100 shown in FIG. 1. Alternatively, the first floor sensor (first sensor) 22 may be fixed to or disposed on the dash floor shown in FIG. 5. As a further alternative, the first floor sensor (first sensor) 22 may be fixed to or disposed on the non-illustrated instrument panel as a central sensor or sensor unit.

As shown in FIG. 6A, the second floor sensor (second sensor) 19 is disposed rearwardly of the first floor sensor (first sensor) 22. The second floor sensor (second sensor) 19 is also fixed to the floor body 210 or the front floor 219 (for example, a rear part of the center tunnel 216). The second floor sensor (second sensor) 19 is preferably disposed on the longitudinal centerline OB of the vehicle 100 shown in FIG. 1. The center tunnel 216 is a same structural member as the vehicle body skeleton structure of the vehicle 100 arranged along the backward direction DB of the vehicle 100. With this arrangement, energy inputted to the cabin of the vehicle 100 is attenuated by the center tunnel (same structural member) 216 so that noise contained in the difference between the output from the first floor sensor (first sensor) 22 (acceleration in the backward direction DB or deceleration a22) and the output from the second floor sensor (second sensor) 19 (acceleration in the backward direction DB or deceleration a19) can be reduced.

It is preferable that the first floor sensor (first sensor) 22 is disposed on one end of the center tunnel (same structural member) 216 and the second floor sensor (second sensor) 19 is disposed on an opposite end of the center tunnel (same structural member) 216. The collision energy inputted to the cabin of the vehicle 100 is attenuated by the center tunnel (same structural member) 216 and, hence, the difference between the respective outputs (accelerations in the backward direction DB or decelerations a22 and a19) from the first and second floor sensors (first and second sensors) 22, 19 provided on the center tunnel 216 becomes large.

The left and right rear satellite impact sensors 16, 17 shown in FIG. 6A are fixed to the rear body 210 or the rear floor 211 (e.g. rear wheel houses), and the satellite saving sensor 18 is fixed to the floor body 210 or a boundary between the front floor 219 and the rear floor 221 (e.g. an upper part 220 of the center cross member 215 connected to the rear part of the center tunnel 216). Preferably, the left and right rear satellite impact sensors 16, 17 shown in FIG. 6A are provided in a bilaterally symmetrical arrangement with respect to the longitudinal centerline OB of the vehicle 100 shown in FIG. 1, and the satellite saving sensor 18 is disposed on the longitudinal centerline OB of the vehicle 100 shown in FIG. 1. The satellite saving sensor 18 may be fixed to a cross member such as the middle cross member 214, the center tunnel 216, or the rear floor 221.

The left and right front satellite impact sensors 14, 15 shown in FIG. 6B are fixed to left and right side panels 209, 208, respectively, or base portions of left and right center pillars (B-pillars) 228 that are connected to the floor body 210. Preferably, the left and right front satellite impact sensors 14, 15 shown in FIG. 6B are provided in a bilaterally symmetrical arrangement with respect to the longitudinal centerline OB of the vehicle 100 shown in FIG. 1.

In FIG. 6B, the main portion of the body of the vehicle 100 includes the body (front body 200 and floor body 210) shown in FIG. 6A, and panels (i.e., a roof panel 203, the right and left side panels 208, 209, and a rear end panel 211). The vehicle body main portion shown in FIG. 6B may be called as a body shell. Though not shown, the vehicle body main portion shown in FIG. 6B may further include, additional to the body shell, a hood or bonnet that can be opened and closed, left and right front doors, left and right rear doors, a lid (trunk cover) or the like attachment component.

Figure 6C:
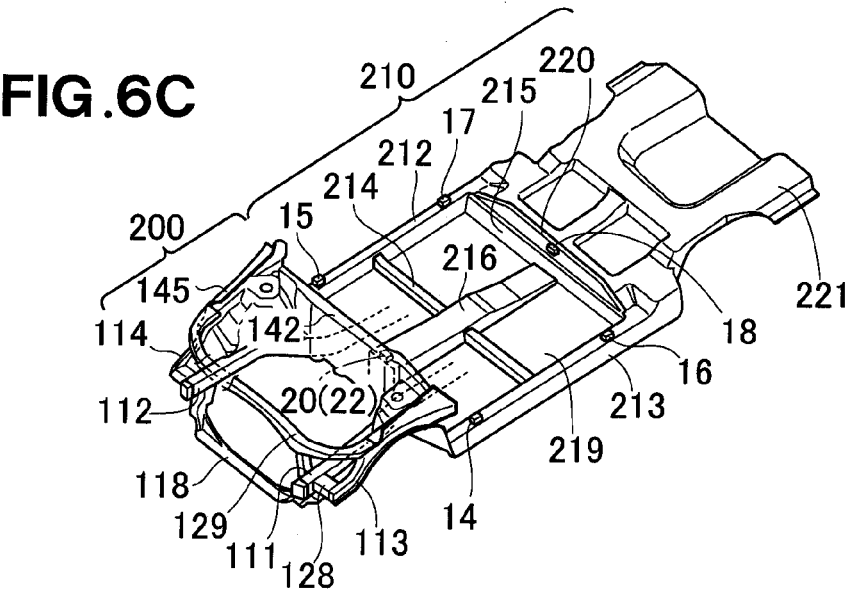
FIG. 6C is a perspective view showing another example of the arrangement of the front and rear satellite impact sensors.

FIG. 6C shows another example of the arrangement of the front satellite impact sensors 14, 15, and the rear satellite impact sensors 16, 17. Referring back to FIG. 3, the determining portion 24 uses outputs from the left front and rear satellite impact sensors 14, 16 (accelerations in the backward direction DB or decelerations a14, a16) as outputs from the first and second sensors to thereby determine the severity of a frontal collision of the vehicle 100. The left front and rear satellite impact sensors 14, 16 are preferably disposed on a same structural member (left side sill 213) of the body skeleton of the vehicle 100. More specifically, the left front and rear satellite impact sensors 14, 16 shown in FIG. 6C are fixed to a front portion and a rear portion, respectively, of the left side sill 213. Alternatively, the left front and rear satellite sensors 14, 16 may be provided at one end and an opposite end, respectively, of the left side sill 213. The floor body 210 shown in FIG. 6C may not be provided with the second floor sensor 19 shown in FIG. 6A.

As an alternative, the determining portion 24 shown in FIG. 3 may use outputs from the right front and rear satellite impact sensors 15, 17 (accelerations in the backward direction DB or decelerations a15, a17) as outputs from the first and second sensors to thereby determine the severity of a frontal collision of the vehicle 100. As a further alternative, the determining portion 24 shown in FIG. 3 may use the outputs from the left and right front satellite impact sensors 14, 15 and the left and right rear satellite impact sensors 16, 17 (accelerations in the backward direction DB or decelerations a14, a15, a16, a17) as the outputs from the first and second sensors so as to determine the severity of a frontal collision.

Figure 7A:
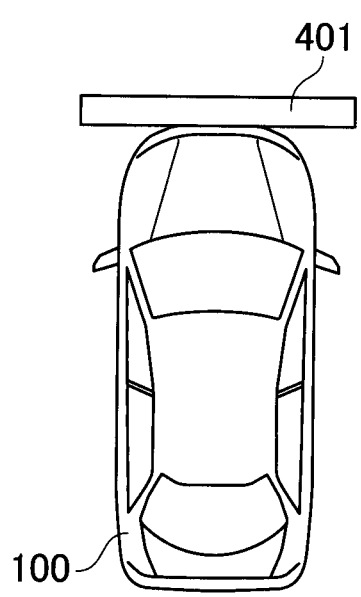
FIG. 7A is a plan view showing one collision mode of the vehicle of FIG. 1.
Figure 7B:
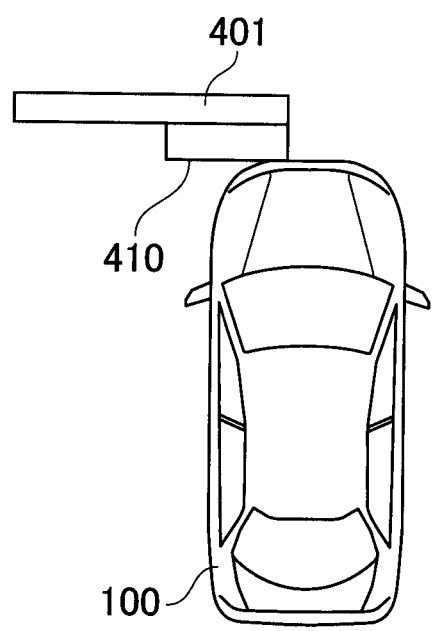
FIG. 7B is a plan view showing another collision mode of the vehicle.

FIGS. 7A and 7B shows examples of the mode of a frontal collision of the vehicle 100 shown in FIG. 1. More specifically, FIG. 7A shows a full-wrap frontal collision in which the entire front end of the vehicle 100 is made to collide with a concrete barrier or wall 401. A method of and conditions for a full-wrap frontal collision test are defined, for example, by National Highway Traffic Safety Administration (NHTSA), and the vehicle speed used in this full-wrap frontal collision test is 35 mph (≈56 km/h). This means that for those vehicles designed for used in in the United States of America, the severity of a frontal collision against the concrete barrier 401 at a rate of 56 km/h (high-speed: first speed region) needs to be set to "high".

The full-wrap frontal collision test method and conditions are also defined by China Automotive Technology & Research Center (CATARC) or China New Car Assessment Program (N-CAP), and the vehicle speed used in this full-wrap frontal collision test is 50 km/h. This means that for those vehicles designed for use in China, the severity of a frontal collision against the concrete barrier 401 at a rate of 50 km/h (high speed: first speed region) needs to be set to "high".

The test method and conditions for the full-wrap frontal collision can thus be defined by the standards, laws, etc. and the severity of the frontal collision is set to "high" according to the specifications required by a particular vehicle to be tested. Furthermore, when the front end of the vehicle 100 is made to collide with the concrete barrier 401 at a rate of 26 km/h (intermediate speed: second speed region lower than the first speed region), the severity of such full-wrap frontal collision is set to "low". Additionally, when the front end of the vehicle 100 is made to collide with the concrete barrier 401 at a rate of 13 km/h (low speed: a third speed region lower than the second speed region), the severity of such full-wrap frontal collision is preferably not set. In other words, the severity of the full-wrap frontal collision of the vehicle 100 against the concrete barrier 401 at a rate of 16 km/h is preferably set to "less severe".

The collision speeds (high speed, intermediate speed, low speed), such as 56 km/h, 50 km/h, 26 km/h and 13 km/h, used herein for determining the collision severity are employed only for the purpose of facilitating easy understanding of the embodiments and may be changed to another speed. For example, the high speed (first speed region) is not less than 37 km/h (first reference value) or 48 km/h (second reference value), and the low speed (third speed region) is less than 19 km/h (second reference value), and the intermediate speed is not less than the second reference value and less than the first reference value.

FIG. 7B shows an ODB (offset deformable barrier) frontal collision in which the front end of a vehicle 100 is made to collide on the driver's side with a honeycomb structure 410. A method of and conditions for an ODB frontal collision test are defined, for example, by the Insurance Institute for Highway Safety (IIHS), and the vehicle speed used in this test is 64 km/h. Thus, for the vehicles designed for use in the U.S.A., the severity of an ODB frontal collision of the vehicle 100 against the honeycomb structure 410 at a rate of 64 Km/h is sometimes set to "high". However, because the honeycomb structure 410 is not rigid, energy inputted to a vehicle cabin during the ODB frontal collision becomes small even through the vehicle collision speed is high. The severity of such ODB frontal collision is, therefore, preferably determined as being "low".

Figure 8A:
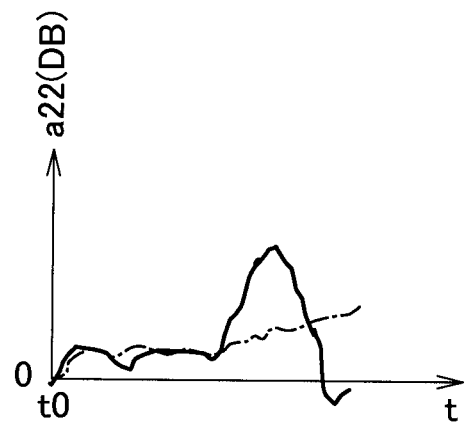
FIG. 8A is a graph showing deceleration at the first floor sensor that varies over time.
Figure 8B:
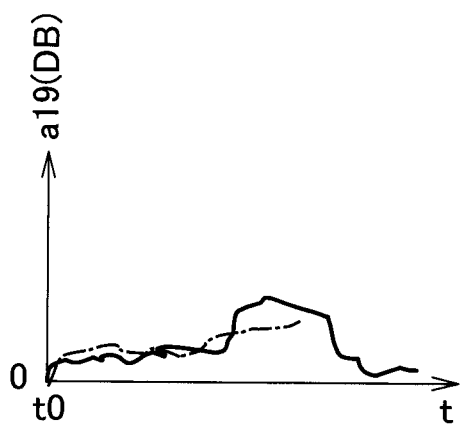
FIG. 8B is a graph showing deceleration at the second floor sensor that varies over time, the second floor sensor being disposed rearwardly of the first floor sensor.
Figure 8C:
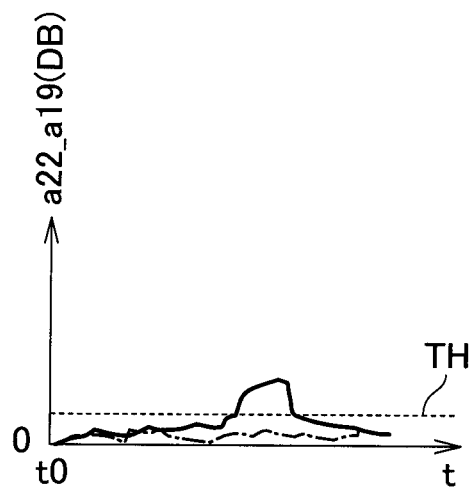
FIG. 8C is a graph showing a one-dimensional threshold used for frontal collision severity determination.

FIG. 8A graphically shows a change in the deceleration a22 over time at the first front sensor (first sensor) 22, FIG. 8B graphically shows a change in the deceleration a19 over time at the second floor sensor (second sensor) 19 located rearwardly of the first sensor 22, and FIG. 8C graphically shows an example of a one-dimensional threshold used for determining the severity of a frontal collision. As previously discussed, the determining portion 24 shown in FIG. 2 is able to determine the frontal collision severity of the vehicle 100 based on the output (acceleration in the backward direction DB of the vehicle 100 or deceleration a22 of the vehicle 100) from the first floor sensor (first sensor) 22 and the output (acceleration in the backward direction DB of the vehicle 100 or deceleration a19 of the vehicle 100) from the second floor sensor (second sensor) 19.

Solid lines shown in FIGS. 8A to 8C correspond to a frontal collision with high severity, and chain lines correspond to a frontal collision with low severity. For instance, when the left front side frame 111 of the vehicle 100 shown in FIG. 5 absorbs large energy at the event of a frontal collision with high severity, part of the energy inputted to the cabin (passenger compartment) is reflected on a large peak of the deceleration a22 detected at the first floor sensor (first sensor) 22 as indicated by the solid line shown in FIG. 8A. In other words, an increase rate and a maximum value of the peak of the solid-lined deceleration a22 shown in FIG. 8A are respectively greater than an increase rate and a maximum value of the peak of the chain-lined deceleration a19 shown in FIG. 8B.

Referring now to the solid line in the graph shown in FIG. 8B, it will be appreciated that the peak of the deceleration a19 detected at the second floor sensor (second sensor) 19 is weakened. This means that when the large energy occurring at the frontal collision with high severity is absorbed by the left front side rail 111, the left front side rail 111 undergoes high-frequency vibration, which causes a floor of the vehicle cabin to undergo vibration. However, because the rigidity of the front floor 219 shown in FIG. 6 is generally low, the high-frequency vibration of the front floor 219 is attenuated progressively as the distance from the left front side frame 111 in the backward direction of the vehicle 100 increases. Thus, the output (peak of the deceleration a22) from the first floor sensor (first sensor) 22, which detects such high-frequency vibration via a front part of the front floor 219 and a front part of the center tunnel 216, is large. On the other hand, the output (peak of the deceleration a19) from the second floor sensor (second sensor) 19, which detects the high-frequency vibration via a rear part of the front floor 219 and a rear part of the center tunnel 216, becomes small.

However, by subtracting the deceleration a19 from the deceleration a22, the solid line shown in FIG. 8C has a peak corresponding to the peak indicated by solid line shown in FIG. 8A. This means that when the difference between the deceleration a22 and the deceleration a19 exceeds a one-dimensional threshold TH shown in FIG. 8C, the determining portion 24 can determine that the severity of the frontal collision of the vehicle 100 is high. Here, the deceleration a22 and the deceleration a19 are preferably such decelerations or accelerations which are obtained respectively through a first band-pass filter 28 and a second band-pass filter 29 shown in FIG. 2. The first band-pass filter 28 is designed to pass a prescribed range of frequencies of the output 22a of the first floor sensor (first sensor) 22. Similarly, the second band-pass filter 29 is designed to pass a prescribed range of frequencies of the output 19a of the second floor sensor (second sensor) 19. The prescribed frequency range of the first band-pass filter 28 is preferably from e.g. 50 Hz to e.g. 200 Hz. Similarly, the prescribed frequency range of the second band-pass filter 29 is preferably from e.g. 50 Hz to e.g. 200 Hz. When the left front side frame 111 functions as a spring and the vehicle cabin (passenger compartment) functions as a weight, a simple harmonic motion, which is determined by a spring constant k of the spring and the mass M of the vehicle cabin, occurs, and a high-frequency vibration caused by the simple harmonic motion distributes in a range of e.g. 50 Hz to e.g. 200 Hz. In the case where the first floor sensor (first sensor) 22 is fixed to the dash floor 142a, the prescribed frequency range of the first band-pass filter 28 is preferably comprised of a first prescribed range of e.g. 50 Hz to e.g. 200 Hz and a second prescribed range of e.g. 300 Hz to e.g. 500 Hz. The prescribed frequency range of the first band-pass filter 28 may be composed of only the second prescribed range because the dash floor 142a has a natural vibration frequency ranging from e.g., 300 Hz to e.g. 500 Hz.

As shown in FIG. 8C, the determining portion 24 shown in FIG. 2 uses the difference between the deceleration a22 and the deceleration a19. As an alternative, the determining portion 24 may calculates an integrated value of the difference between the deceleration a22 and the deceleration a19. In the latter case, the determining portion 24 can more easily determine the severity of a frontal collision. Here, the integrated value of the difference may be a section integrated value (i.e., an integrated value of the differences from a fixed time before the current time to the current time) or all sections integrated value (i.e., an integrated value of the differences from a time t0 to the current time). The section integrated value may be a first-order section integrated value, or a second-order section integrated value. The second-order section integrated value requires a greater calculation amount than the first-order section integrated value.

Referring now to the chain line shown in FIG. 8B, when the vehicle 100 is subjected to small input energy, an output waveform (indicative of the deceleration a19) of the second floor sensor (second sensor) 19 is similar to the output waveform (indicative of the deceleration a22) of the first floor sensor (first sensor) 22 indicated by the chain line shown in FIG. 8A. The chain line obtained by subtracting the deceleration a19 from the deceleration a22 does not exceed the one-dimensional threshold TH shown in FIG. 8C.

The determining portion 24 shown in FIG. 3 may determine the severity of a frontal collision of the vehicle 100 by first calculating the difference (or an integrated value of the difference) between an output (acceleration in the backward direction DB of the vehicle 100 or deceleration a15 of the vehicle 100) of the right front satellite impact sensor (first sensor) 15 and an output (acceleration in the backward direction DB of the vehicle 100 or deceleration a17 of the vehicle 100) of the right rear satellite impact sensor (second sensor) 17, and then perform determination as to whether the calculated difference (or calculated integrated value of the difference) exceeds the one-dimensional threshold TH shown in FIG. 8C.

Figure 9A:
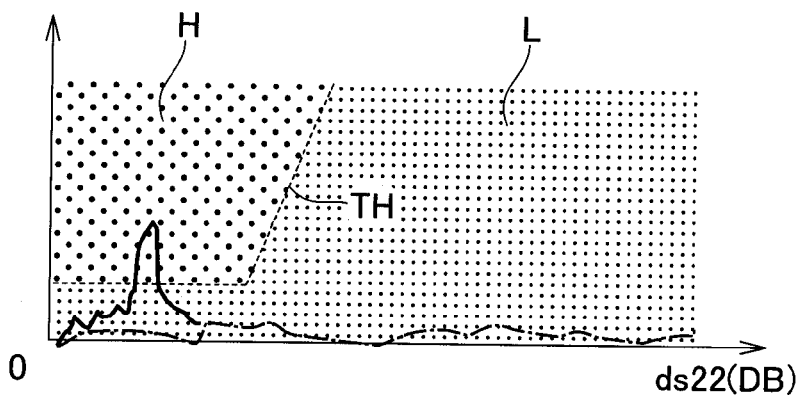
FIG. 9A is a graph showing a two-dimensional threshold used for frontal collision severity determination.
Figure 9B:
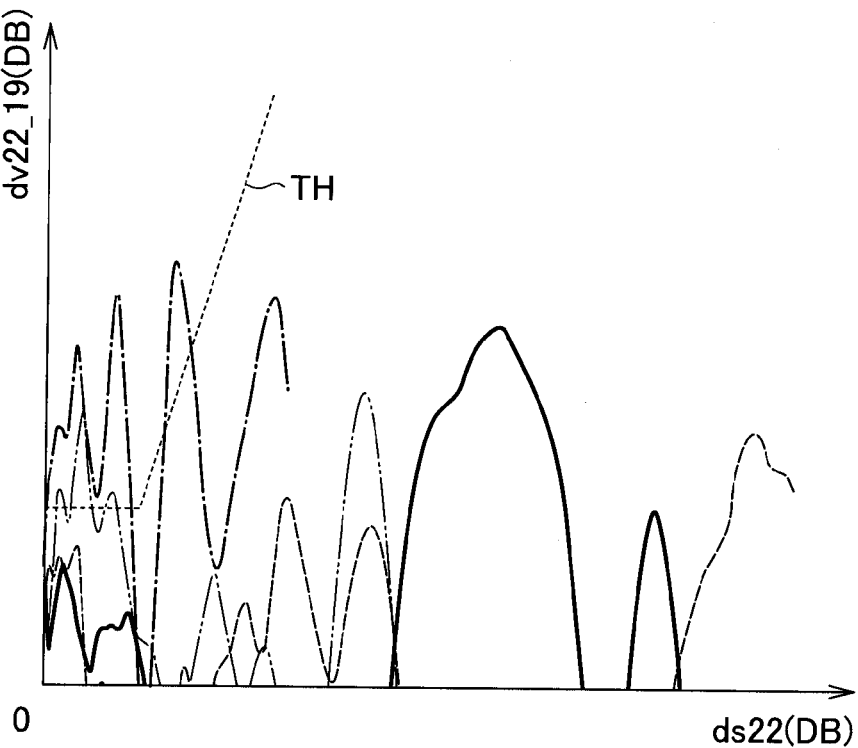
FIG. 9B is a graph illustrative of the manner in which collision severity determination is performed on various modes of collision using the two-dimensional threshold shown in FIG. 9A.

FIGS. 9A and 9B show two-dimensional thresholds used for frontal collision severity determination. The determining portion 24 shown in FIG. 2 may use a two-dimensional threshold TH which is determined by an integrated value of the difference between the deceleration a22 and the deceleration a19 and an integrated value of the deceleration a22, instead of using the one-dimensional threshold TH determined on the basis of the difference (or an integrated value of the difference) between the deceleration a22 and the deceleration a19 and the current time. In other words, the determining portion 24 may determine the severity of a frontal collision of the vehicle 100 by making a determination as to whether a coordinate determined by the two integrated values exceeds a two-dimensional threshold TH in a two-dimensional map shown in FIG. 9A. The two-dimensional map or the two-dimensional threshold TH is stored in a storage portion 26 shown in FIG. 2. The storage portion 26 may further store other items of data such as the results of determination and the results of calculation that are obtained by the determining portion 24.

When a frontal collision of the vehicle 100 is not severe, the vehicle collision determination apparatus or the determining portion 24 may not cause deployment of a driver's-seat-side airbag and a front-passenger-seat-side airbag. In other words, when the vehicle 100 is subjected to a severe frontal collision, the determining portion 24 is able to cause deployment of the driver's-seat-side airbag and the front-passenger-seat-side airbag. In this instance, the determining portion 24 operates to more properly set hardness (or an internal pressure) of the driver's-seat-side airbag and the front-passenger-side airbag depending on the frontal collision severity. When the frontal collision severity of the vehicle 100 is high, the determining portion 24 can control operation of not only the driver's-seat-side airbag and the front-passenger-seat-side airbag, but also a pretensioner 41, and a load determination mechanism 45, for example. Thus, the determining portion 24 is able to more properly set a passenger binding force (passenger protecting force) by way of a webbing 46 depending on the frontal collision severity. The frontal collision severity is evaluated in a scale having more than two levels. For instance, when the severity of a frontal collision includes two adjacent levels, the determining portion 24 may determine as to whether the frontal collision severity is high or not and/or the frontal collision severity is low or not.

The two-dimensional map shown in FIG. 9A includes a plurality (two in the illustrated embodiment) of regions L and H. More specifically, the first region L indicates that the frontal collision severity is low, and the second region H which is adjacent to the first region L indicates that the collision severity is high. A boundary between the first region L and the second region H is set to a two-dimensional threshold TH. When a coordinate, which is decided by an integrated value of the difference between the first acceleration (deceleration a22) at the first floor sensor 22 and the second acceleration (deceleration a19) at the second floor sensor 19 and an integrated value of the first acceleration (deceleration a22) at the first floor sensor 22, exceeds the two-dimensional threshold TH, the determining portion 24 can determine that the frontal collision severity of the vehicle 100 is high (region H)

The vertical axis dv22_19(DV) of the two-dimensional map shown in FIG. 9A represents the integrated value of the difference between the first acceleration in the vehicle backward direction DB (or deceleration a22) at the first floor sensor 22 and the second acceleration in the vehicle backward direction DB (or deceleration a19) at the second floor sensor 19. More specifically, the determining portion 24 performs the first-order section integration of the difference between the deceleration a22 and the deceleration a19 to thereby calculate or generate a backward first-order section integrated value. The determining portion 24 may perform the second-order section integration of the difference between the deceleration a22 and the deceleration a19 to thereby calculate or generate a backward second-order section integrated value, in place of the backward first-order section integrated value (dv22_19(DB). The backward second-order section integrated value requires a larger amount of calculation than the backward first-order section integrated value.

The horizontal axis ds22(DB) of the two-dimensional map shown in FIG. 9A represents the integrated value of the first acceleration in the vehicle backward direction DB (or deceleration a22) at the first floor sensor 22. More specifically, the determining portion 24 performs the second-order integration of the deceleration a22 to thereby calculate or generate a backward second-order section integrated value. The determining portion 24 may perform the first-order section integration of the deceleration a22 to thereby calculate or generate a backward first-order section integrated value (dv22(DB)), in place of the backward second-order section integrated value (ds22(DB)). Furthermore, the horizontal axis ds22(DB) of the two-dimensional map shown in FIG. 9A may be changed to represent the backward second-order section integrated value (ds19(DB)), which is the integrated value of the second acceleration in the vehicle backward direction DB (or deceleration a19) at the second floor sensor 19.

In the case where the integrated value of the difference between the first deceleration a22 and the second deceleration a19 are used for determination by the determining portion 24, the determining portion 24 is able to more easily perform the frontal collision severity determination for a reason discussed below.

In the graph shown in FIG. 9A, the solid line corresponds to the solid line (indicative of a frontal collision with high severity) shown in FIG. 8C, and the chain line shown in FIG. 9A corresponds to the chain line (indicative of a frontal collision with low severity) shown in FIG. 8C. The chain line shown in 8C is close to the one-dimensional threshold TH, while the chain line shown in FIG. 9A is far from the two-dimensional threshold TH. FIG. 9B shows a two-dimensional map including a plurality of curves showing a corresponding number of frontal collisions of the vehicle 100. The chain line shown in FIG. 9B corresponds to a first full-wrap frontal collision where the vehicle 100 is made to collide with the concrete wall or barrier 401 at e.g. 56 km/h (high speed: first speed region), and the two-dot chain line shown in FIG. 9B corresponds to a second full-wrap frontal collision where the vehicle 100 is made to collide with the concrete barrier 401 at e.g. 37 km/h (high speed: first speed region).

In FIG. 9B, the first and second full-wrap frontal collisions (indicated by the chain line and the two-dot chain line, respectively) exceed the two-dimensional threshold TH, and the determining portion 24 can determine that the first and second full-wrap frontal collisions are high in severity. The high speed (first speed region) is not less than e.g. 37 km/h, and the second full-wrap frontal collision (indicated by the two-dot chain line) occurring at 37 km/h corresponding to a lower limit of the first speed region is sufficiently separated from the two-dimensional threshold TH.

In the graph shown in FIG. 9B, the solid lines correspond to a third full-wrap frontal collision where the vehicle 100 is made to collide with the concrete barrier 401 at e.g. 26 km/h (intermediate speed: second speed range). Furthermore, the broken lines shown in FIG. 9B correspond to a high-speed ODB (offset deformable barrier) frontal collision where the vehicle 100 is made to collide on the driver's seat side with the honeycomb structure 410 at e.g. 64 km/h. The third full-wrap frontal collision and the high-speed ODB frontal collision are sufficiently separated from the two-dimensional threshold TH. When the third full-wrap frontal collision occurs, the speed of the vehicle 100 is low (26 km/h) and, hence, collision energy inputted to the vehicle cabin is small. Similarly, when the high-speed ODB frontal collision occurs, the speed of the vehicle 100 is high but, due to the softness of the honeycomb structure 410, collision energy inputted to the vehicle cabin becomes small. These frontal collisions are determined as being "low" in severity and according to the thus determined severity, the determining portion 24 is able to more appropriately protect the vehicle occupant.

Figure 10:
FIG. 10 is a graph showing a two-dimensional threshold used for determining first deployment timing that causes deployment of an airbag for a driver's seat and/or an airbag for a front passenger seat.

FIG. 10 shows an example of a two-dimensional threshold used for determining first deployment timing that causes first deployment of the airbag for the driver's seat and/or the airbag for the front passenger seat. The determining portion 24 can determine the severity of a frontal collision by using the two-dimensional maps shown in FIGS. 9A and 9B and, accordingly, the determining portion can further determine the first deployment timing according to the determined frontal collision severity by using the two-dimensional threshold THON shown in FIG. 10. In other words, the determining portion 24 can determine whether or not a frontal collision of the vehicle 100 occurs by using the output (deceleration a22 in the backward direction DB) of the first sensor (e.g. first floor sensor 22). The two-dimensional threshold is stored in the storage portion 26 shown in FIG. 2. A two-dimensional map or the two-dimensional threshold THON shown in FIG. 10 is only one example out of many and another method can be used.

The vertical axis dv22(DB) and the horizontal axis ds22(DB) of the graph shown in FIG. 10 represent integrated values of the first deceleration (deceleration a22) in the vehicle backward direction DB at the first floor sensor 22. More specifically, the vertical axis dv22(DB) is a first-order section integrated value of the deceleration a22 and the horizontal axis ds22(DB) is a second-order section integrated value of the deceleration a22. The second-order section integrated value ds22(DB) and the first-order section integrated value dv22(DB) may be replaced with a second-order all-sections integrated value and a first-order all-sections integrated value, respectively.

In the graph shown in FIG. 10, the chain line corresponds the chain line shown in FIG. 9B, which represents the first full-wrap frontal collision where the vehicle 100 is made to collide with the concrete wall or barrier 401 at e.g. 56 km/h (high speed: first speed region). A two-dot chain line shown in FIG. 10 corresponds to the two-dot chain line shown in FIG. 9B, which represents the second full-wrap frontal collision where the vehicle 100 is made to collide with the concrete barrier 401 at e.g. 37 km/h (high speed: first speed region). A thick solid line shown in FIG. 10 corresponds to the solid line shown in FIG. 9B, which represents the third full-wrap frontal collision where the vehicle 100 is made to collide with the concrete barrier 401 at e.g. 26 km/h (intermediate speed: second speed region). A thin solid line shown in FIG. 10 has no counterpart shown in FIG. 9B.

In the graph shown in FIG. 10, the broken line corresponds the broken line shown in FIG. 9B, which represents the ODB frontal collision where the vehicle 100 is made to collide with the honeycomb structure 410 at e.g. 64 km/h. As shown in FIG. 10, all lines excluding the thin solid line, namely, the chain line, the two-dot chain line, the thick solid line, and the broken line exceed the two-dimensional threshold THON. The thin solid line shown in FIG. 10 corresponds to a fourth full-wrap frontal collision where the vehicle 100 is made to collide with the concrete barrier 401 at e.g. 13 km/h (low speed: third speed region). In this instance, the determining portion 24 may not cause deployment of the airbag for the driver's seat and the airbag for the front passenger seat.

On the other hand, by using the two-dimensional threshold THON shown in FIG. 10, the determining portion 24 can determine as to whether or not the current time is the first deployment timing. For example, at the time when each of the chain line, the two-dot chain line, the thick solid line and the broken line exceeds the two-dimensional threshold THON, the determining portion 24 can activate a first inflator 21-1 for the driver's-seat-side airbag module 21 and a first inflator 23-1 for the front-passenger-seat-side airbag module 23.

Figure 11:
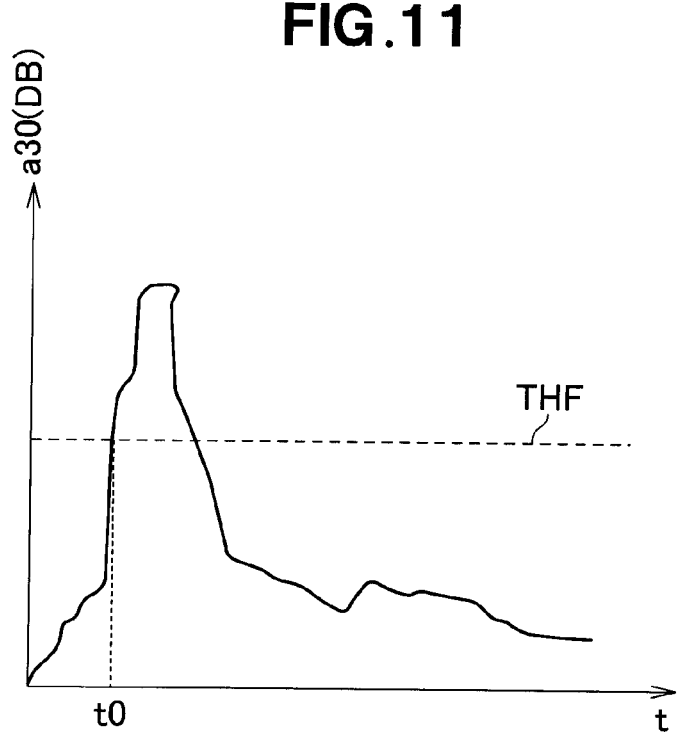
FIG. 11 is a graph showing a one-dimensional threshold used for determining that a frontal collision has occurred.

FIG. 11 is a graph showing an example of a one-dimensional threshold THF used for determining that a collision of the vehicle occurs. The vertical axis a30(DB) of the graph shown in FIG. 11 represents a first acceleration (deceleration a30) in the vehicle backward direction DB at the front sensor 30. The horizontal axis t of the graph shown in FIG. 11 represents time or current time. For instance, when a frontal collision of the vehicle occurs, an output from the front sensor 30 indicates acceleration in the backward direction DB which exceeds the one-dimensional threshold THF. In FIG. 11, the output from the front sensor 30 exceeds the one-dimensional threshold THF at time t0. At the time t0, the determining portion 24 may begin to plot a coordinate (dv22(DB), dv22_19(DB)) in the two-dimensional map shown in FIG. 9A so as to decide which region L, H in the two-dimensional map shown in FIG. 9A the coordinate (dv22(DB), dv22_19(DB)) at the current time belongs to, for the purpose of determining the severity of the frontal collision. Similarly, at the time t0, the determining portion 24 may start determining whether a coordinate ds22(DB), dv22 (DB)) at the current time exceeds the two-dimensional threshold THON shown in FIG. 10.

Figure 12A:
FIGS. 12A, 12B and 12C are diagrammatical views showing examples of control operation of the airbag according to the frontal collision severity.
Figure 12B:
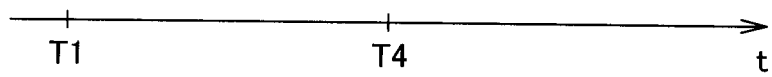
Figure 12C:
Figure 12D:
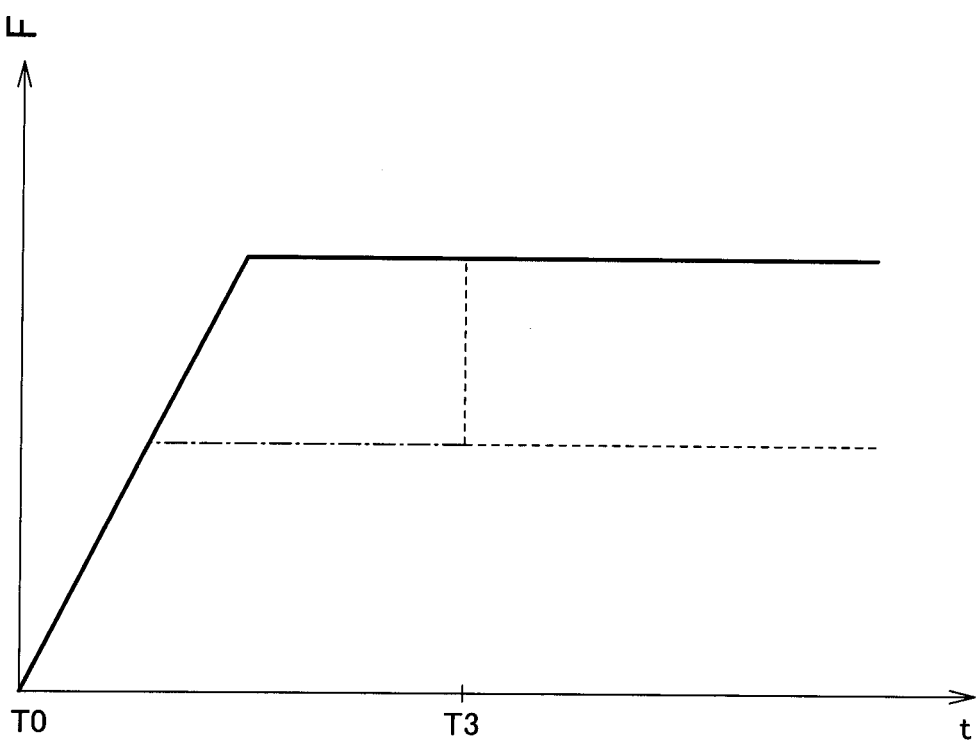
FIG. 12D is a graph showing an example of control operation of a webbing according to the frontal collision severity.

FIGS. 12A, 12B and 12C are diagrams showing examples of control operation of an airbag according to the frontal collision severity, and the FIG. 12D is a graph showing an example of control operation of the webbing 46. When the frontal collision severity is high, the determining portion 24 can activate the first inflator 21-1 and a second inflator 21-2 for the driver's-seat-side airbag module 21 substantially at the same time. More specifically, as shown in FIG. 12A, the determining portion 24 first activates the first inflator 21-1 at time T1 and subsequently activates the second inflator 21-2 at time T2, where the time interval between T1 and T2 is 5 ms, for example.

The time T1 shown in FIG. 12A corresponding to a time point where the coordinate (dv22(DB), dv22_19(DB)) at the current time belongs to the region H in the map shown in FIG. 9A and the coordinate (ds22(DB), dv22(DB)) at the current time exceeds the two-dimensional threshold THON shown in FIG. 10.

When the frontal collision severity is low, determining portion 24 sets an interval between the time T1 (at which the first inflator 21-1 for the driver's-seat-side airbag module 21 is activated) and the time T4 (at which the second inflator 21-2 for the driver's-seat-side airbag module 21 is activated), which is longer than the time interval between T1 and T2, as shown in FIG. 12B. The time interval between T1 and T4 is 40 ms, for example. The determining portion 24 may change the time interval between T1 and T4 according to the mode of frontal collision. Furthermore, the time interval between T1 and T4 and the time interval between T1 and T2 are stored in the storage portion 26 shown in FIG. 2. Alternatively, when the frontal collision severity is low, the determining portion 24 may activate only the first inflator 21-1 at the time T1, as shown in FIG. 12C.

The frontal collision severity may be determined or confirmed before the time T2 is reached. The time T2 is second deployment timing which follows the first deployment timing T1 shown in FIG. 12A with a time interval of e.g. 5 ms. For instance, when the coordinate (dv22(DB), dv22_19(DB)) enters the region H shown in FIG. 9A before the time T2 is reached, the determining portion 24 can determine or confirm that the frontal collision severity is high. Alternately, when the coordinate (dv22(DB), dv22_19 (DB)) does not enter the region H before the time T2 is reached, the determining portion 24 can determine or confirm that the frontal collision severity is low.

The seatbelt device shown in FIG. 2 includes the control unit 40, the webbing 46, the winding device (retractor) 44, and a buckle switch 48. The winding device (retractor) 44 shown in FIG. 2 includes the pretensioner 41, a locking mechanism 42, an electric motor 43, and the load determination mechanism 45. When the determining portion 24 determines the frontal collision severity, the seatbelt device is able to more appropriately set a passenger binding force (passenger protecting force) by the webbing 46 according to the frontal collision severity determined by the determining portion 24.

For instance, at the time T0, the determining portion 24 determines that a frontal collision occurs and it also outputs a determination result to the control unit 40. Based on the determination result, the control unit 40 drives the electric motor 43 with maximum current to thereby retract the webbing 46 into the winding device (retractor) 44. At the same time, the controller 40 activates an inflator (not shown) of the pretensioner 41 to thereby pull the webbing 46 into the winding device (retractor) 44. Thereafter, the passenger starts moving in the forward direction DF, and the control unit 40 operates the locking mechanism 42 to lock one end of a torsion bar (not shown) of the load determination mechanism 45, thereby limiting pulling-out or extraction of the webbing 46. The load determination mechanism 45 includes not only the torsion bar but also an energy absorption plate (not shown) so that during operation of the load determination mechanism 45, the torsion bar undergoes torsional deformation, and the energy absorption plate undergoes elastic deformation.

By thus using a combination of the torsion bar and the energy absorption plate, a binding force (retracting load) F by the webbing 48 increases gradually from time T0 and thereafter becomes constant, as indicated by the solid line shown in FIG. 12D. A typical example of techniques in which both the torsion bar and the energy absorption plate are employed when the occupant is heavy in weight (or the occupant is an adult) is disclosed in Japanese Patent Application Laid-open Publication (JP-A) No. 2011-079387.

Even when both the torsion bar and the energy absorption plate are already selected for an adult occupant before the event of a frontal collision, the control unit 40 shown in FIG. 2 is able to control the load determination mechanism 45 in such a manner as to select only the torsion bar upon occurrence of a frontal collision if the severity of the frontal collision is low. More specifically, at time T3 shown in FIG. 12D, the determining portion 24 determines or confirms that the frontal collision severity is low, and based on this determination or confirmation, the control unit 40 controls the load determination mechanism 45 to release the locking by the energy absorption plate at time T3. Thus, at time T3, the torsion bar remains selected so that the binding force (retracting load) F by the webbing 46 is reduced as indicated by the broken line shown in FIG. 12D. After the time T3, one of a plurality (two in the illustrated embodiment) of binding forces F can thus be determined or selected, as indicated by the solid line and the broken line shown in FIG. 12D.

When the occupant is light in weight (or when the occupant is a child), only the torsion bar is selected before the event of a frontal collision such that before the time T3, the binding force F of the webbing 45 gradually increases from time T0 until it reaches a relatively small value indicated by the chain line shown in FIG. 12D and, thereafter, the binding force F becomes substantially constant. Even when only the torsion bar is previously selected for a child occupant, the control unit 40 shown in FIG. 2 may control the load determination mechanism 45 upon occurrence of a frontal collision in such a manner that when the severity of the frontal collision is low, opposite ends of the torsion bar are fully locked to thereby lower the binding force F below the level indicated by the broken line shown in FIG. 12D.

Figure 13:
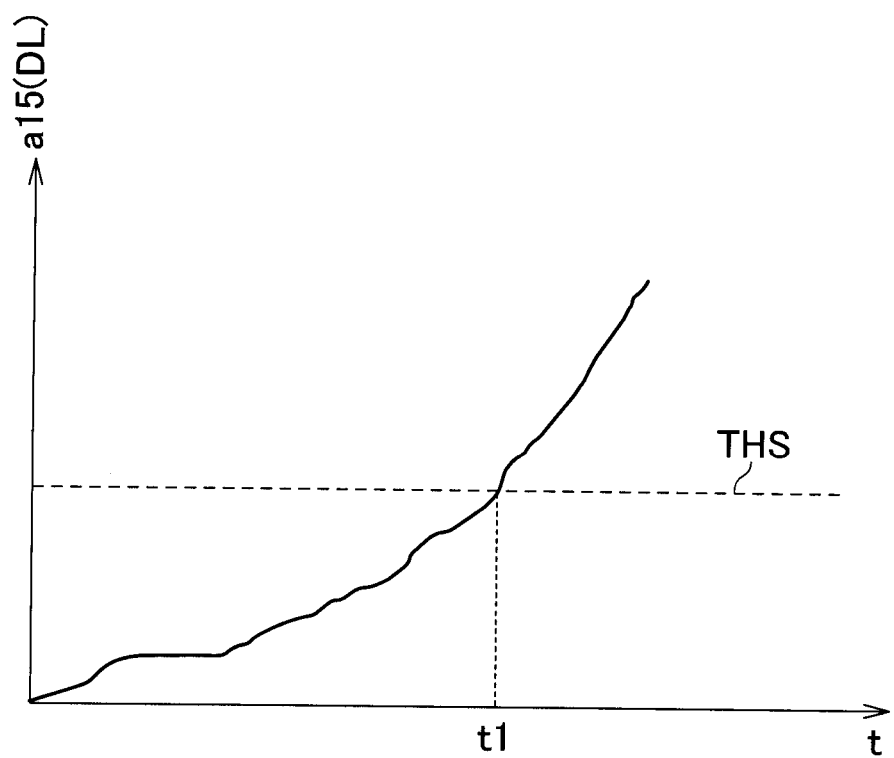
FIG. 13 is a graph showing a one-dimensional threshold used for determining side-airbag deployment timing.

FIG. 13 is a graph showing an example of a one-dimensional threshold THS used for determining side-airbag deployment timing. As previously described, the determining portion 24 shown in FIG. 3 is able to determine the severity of a frontal collision of the vehicle 100 based on the output (first acceleration in the backward direction DB or first deceleration a15 of the vehicle 100) of e.g. the right front satellite impact sensor (first sensor) 15 and the output (second acceleration in the backward direction DB or second deceleration a17 of the vehicle 100) of the right rear satellite impact sensor (second sensor) 17. The outputs of the right front and rear satellite impact sensors 15, 17 shown in FIG. 3 involve biaxial components, and the determining portion 24 shown in FIG. 3 can determine whether a side collision of the vehicle 100 occurs based on an output (third acceleration in the leftward direction DL of the vehicle) of the right front satellite impact sensor (first sensor) 15 and an output (fourth acceleration in the leftward direction DL of the vehicle 100) of the right rear satellite impact sensor (second sensor) 17.

The vertical axis of the graph shown in FIG. 13 represents the third acceleration a15 in the vehicle leftward direction DL at the right front satellite impact sensor (first sensor) 15. The vertical axis of the graph shown in FIG. 13 may be changed to represent either the fourth acceleration a17 in the vehicle leftward direction DL at the right rear satellite impact sensor (second sensor) 17, or a combination (e.g. an addition average value) of the third acceleration and the fourth acceleration.

The horizontal axis of the graph shown in FIG. 13 represents time or current time t. It will be appreciated that the determining portion 24 needs not generate an integrated value in order to set the horizontal axis of the graph shown in FIG. 13.

In the graph shown in FIG. 13, the solid line corresponds to a side collision (not shown) where a lateral side such as a right front door and a right rear door of the vehicle 100 are made to collide with a barrier or another vehicle. When a side collision of the vehicle 100 occurs, outputs from the right front and rear satellite impact sensors 15, 17 are indicative of accelerations (third and fourth accelerations) in the leftward direction DL which exceed a threshold THS. In this instance, the determining portion 24 is able to control a right side-airbag module 27 so as to cause deployment of a right side-airbag. It is preferable for the determining portion 24 to control the right side-airbag module 27 when the outputs from the right front and rear satellite impact sensors 15, 17 represent leftward accelerations in excess of the threshold THS and an output from the satellite saving sensor 18 represents leftward acceleration in excess of a threshold (not shown). Obviously, the determining portion 24 is able to control a left side-airbag module 25 when outputs from the left front and rear satellite impact sensors 14, 16 represent accelerations in the rightward direction DR which are in excess of the threshold THS shown in FIG. 13. Thus, when a side collision of the vehicle 100 occurs, the determining portion 24 is able to cause deployment of a side-airbag based on the outputs from either the right satellite impact sensors 15, 17 or the left satellite impact sensors 14, 16.

Obviously, various minor changes and modifications of the present invention are possible in the light of the above teaching. It is therefore to be understood that within the scope of the appended claims the invention may be practiced otherwise than as specifically described.

What is claimed is:

1. A vehicle collision determination apparatus comprising:
a first sensor and a second sensor provided in a cabin of a vehicle; and
a vehicle collision determination unit, configured as an electronic control unit, in communication with the first sensor and the second sensor to receive an output from the first sensor and an output from the second sensor, the vehicle collision determination unit comprising a determining portion that determines severity of a frontal collision of the vehicle based on a difference between the output from the first sensor and the output from the second sensor,
wherein the output from the first sensor includes a first acceleration in a backward direction of the vehicle,
wherein the output from the second sensor includes a second acceleration in the backward direction of the vehicle,
wherein the first sensor and the second sensor are arranged along the backward direction, spaced from each other, and aligned with each other along a longitudinal direction of the vehicle, the longitudinal direction extending from a front end of the vehicle to a rear end of the vehicle,
wherein the first sensor and the second sensor are provided on a same structural member of a vehicle body skeleton of the vehicle, the same structural member being disposed along the backward direction, and
wherein the vehicle collision determination unit controls an associated vehicle safety device based on the severity of the frontal collision of the vehicle determined by the determining portion.

2. The vehicle collision determination apparatus according to claim 1, wherein the determining portion determines the severity of the frontal collision based on an integrated value of the difference.

3. The vehicle collision determination apparatus according to claim 1, wherein the determining portion determines the severity of the frontal collision based on an integrated value of the difference and an integrated value of either one of the output from the first sensor and the output from the second sensor.

4. The vehicle collision determination apparatus according to claim 1, wherein the determining portion determines the severity of the frontal collision based on the difference and a current time point at which the output from the first sensor and the output from the second sensor used to calculate the difference is sensed.

5. The vehicle collision determination apparatus according to claim 1, wherein the first sensor and the second sensor are disposed along a longitudinal centerline of the vehicle.

6. The vehicle collision determination apparatus according to claim 1, wherein the first sensor is disposed on one end of the same structural member, and the second sensor is disposed on an opposite end of the same structural member.

7. The vehicle collision determination apparatus according to claim 1, wherein the determining portion determines whether or not the frontal collision has occurred by using the output from the first sensor.

8. The vehicle collision determination apparatus according to claim 1, further comprising:
    a first band-pass filter which passes a prescribed range of frequencies of the output from the first sensor; and
    a second band-pass filter which passes the prescribed range of frequencies of the output from the second sensor.

9. The vehicle collision determination apparatus according to claim 1, wherein the determining portion, on the basis of the severity of the frontal collision, determines one corresponding binding force selected from among a plurality of binding forces, and the one corresponding binding force is produced while a webbing provided on the vehicle is restraining an occupant of the vehicle upon the occurrence of the frontal collision.

10. A vehicle collision determination apparatus, comprising:
    a first sensor and a second sensor provided in a cabin of a vehicle; and
    a vehicle collision determination unit, configured as an electronic control unit, in communication with the first sensor and the second sensor to receive an output from the first sensor and an output from the second sensor, the vehicle collision determination unit comprising a determining portion that determines severity of a frontal collision of the vehicle based on a difference between the output from the first sensor and the output from the second sensor,
    wherein the output from the first sensor includes a first acceleration in a backward direction of the vehicle,
    wherein the output from the second sensor includes a second acceleration in the backward direction of the vehicle,
    wherein the first sensor and the second sensor are arranged along the backward direction, disposed on a lateral side of the vehicle, spaced from each other, and aligned with each other along a longitudinal line parallel to a longitudinal direction of the vehicle, the longitudinal direction extending from a front end of the vehicle to a rear end of the vehicle, and
    wherein the vehicle collision determination unit controls an associated vehicle safety device based on the severity of the frontal collision of the vehicle determined by the determining portion.

11. The vehicle collision determination apparatus according to claim 10, wherein the output from the first sensor includes a third acceleration in a rightward or leftward direction of the vehicle, the output from the second sensor includes a fourth acceleration in the rightward or leftward direction of the vehicle, and the determining portion determines whether or not a side collision of the vehicle has occurred by using the third acceleration and the fourth acceleration.

12. The vehicle collision determination apparatus according to claim 10, wherein the determining portion, on the basis of the severity of the frontal collision, determines one corresponding binding force selected from among a plurality of binding forces, and the one corresponding binding force is produced while a webbing provided on the vehicle is restraining an occupant of the vehicle upon the occurrence of the frontal collision.

* * * * *